INVENTOR.
John R. McConnell
BY

United States Patent Office 3,401,254
Patented Sept. 10, 1968

3,401,254
AUTOMATIC FUSION WELDER FOR STRUC-
TURAL STEEL MEMBERS
John R. McConnell, 148 Woodside Ave.,
Ridgewood, N.J. 07450
Filed Apr. 6, 1964, Ser. No. 357,580
5 Claims. (Cl. 219—125)

ABSTRACT OF THE DISCLOSURE

A fusion welding apparatus for the assembly fabrication of rolled structural steel members having a longitudinal track which supports a pair of dual mobile inwardly facing arc welding units symmetrically located on opposite sides of transverse mid-length shaft anchorage. A dial mechanism is connected to a respacing shaft for registering the distance the welders are positioned from the mid-length anchorage. An automatically guided self-powered fusion welding carriage places and fusion welds a connection T to the web portion of the structural shapes whereby the shapes are conveyed on a conveyor belt into the apparatus, are length centered, measured, laid out, connection details are applied and the connection T welded thereto. A power hoist and device arrangement on an over-head track for rotation of the shapes for the welding operation.

---

It is an object of the present invention to set forth an automatic apparatus for the handling, movement, preparation, assembling and fastening together of the plural component work pieces consisting of the main rolled shape and the details.

The primary objective is to provide an integrated co-acting apparatus that will produce unit members that are completely finished unitary end products ready for erection-assembly in a structure.

Another objective is to provide a machine that will automatically convey, position, length-centre, measure, lay-out, assemble and fabricate the member producing a completed member of precise overall length from a raw shape of shorter random length.

It is also an objective to provide a versatile, flexible apparatus for the rapid economical movement of the material with the fabrication performed in a single handling of the material.

Another objective is to provide a means that will quickly process members of various lengths, depths, widths and weights.

Figure 1:
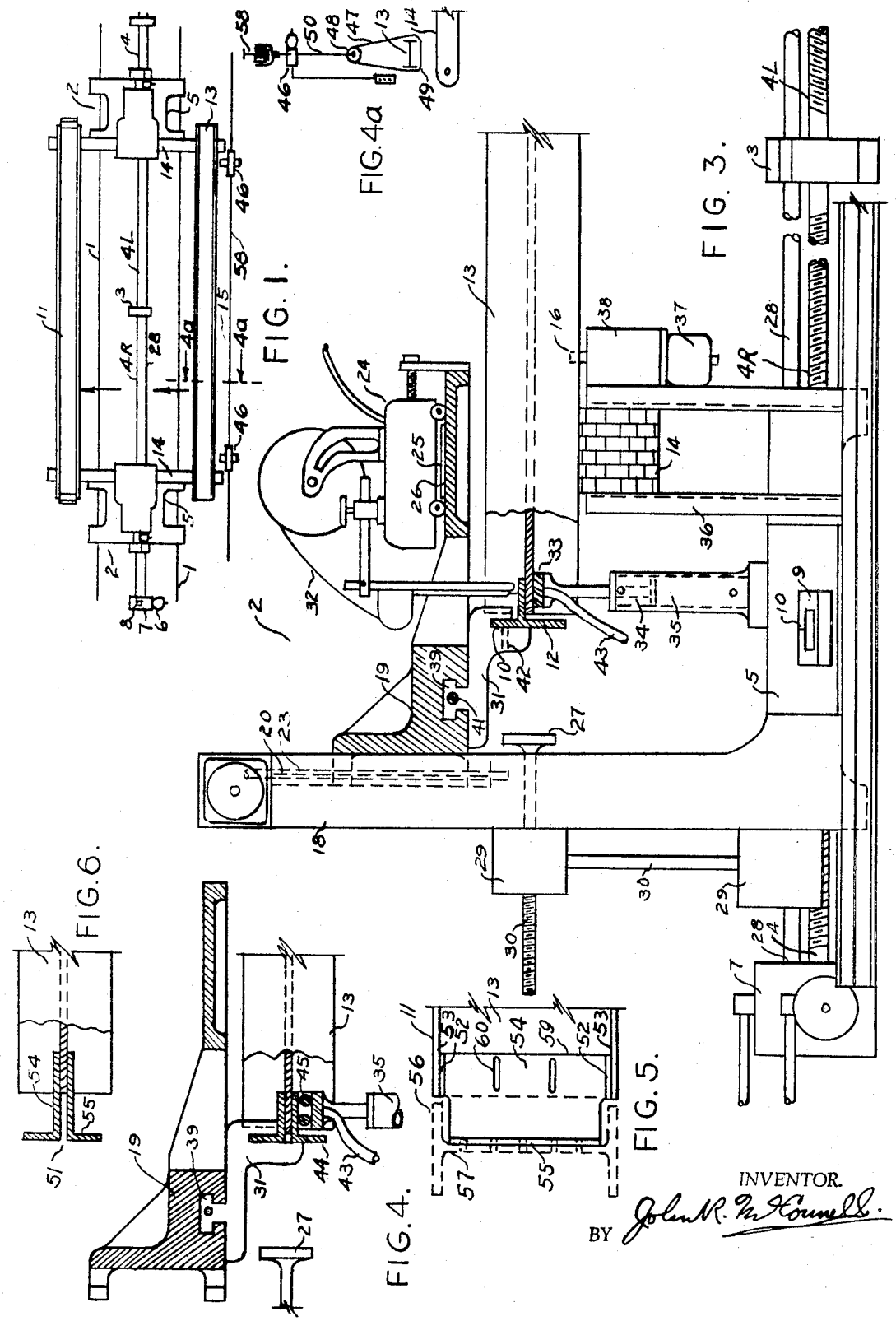
Figure 2:
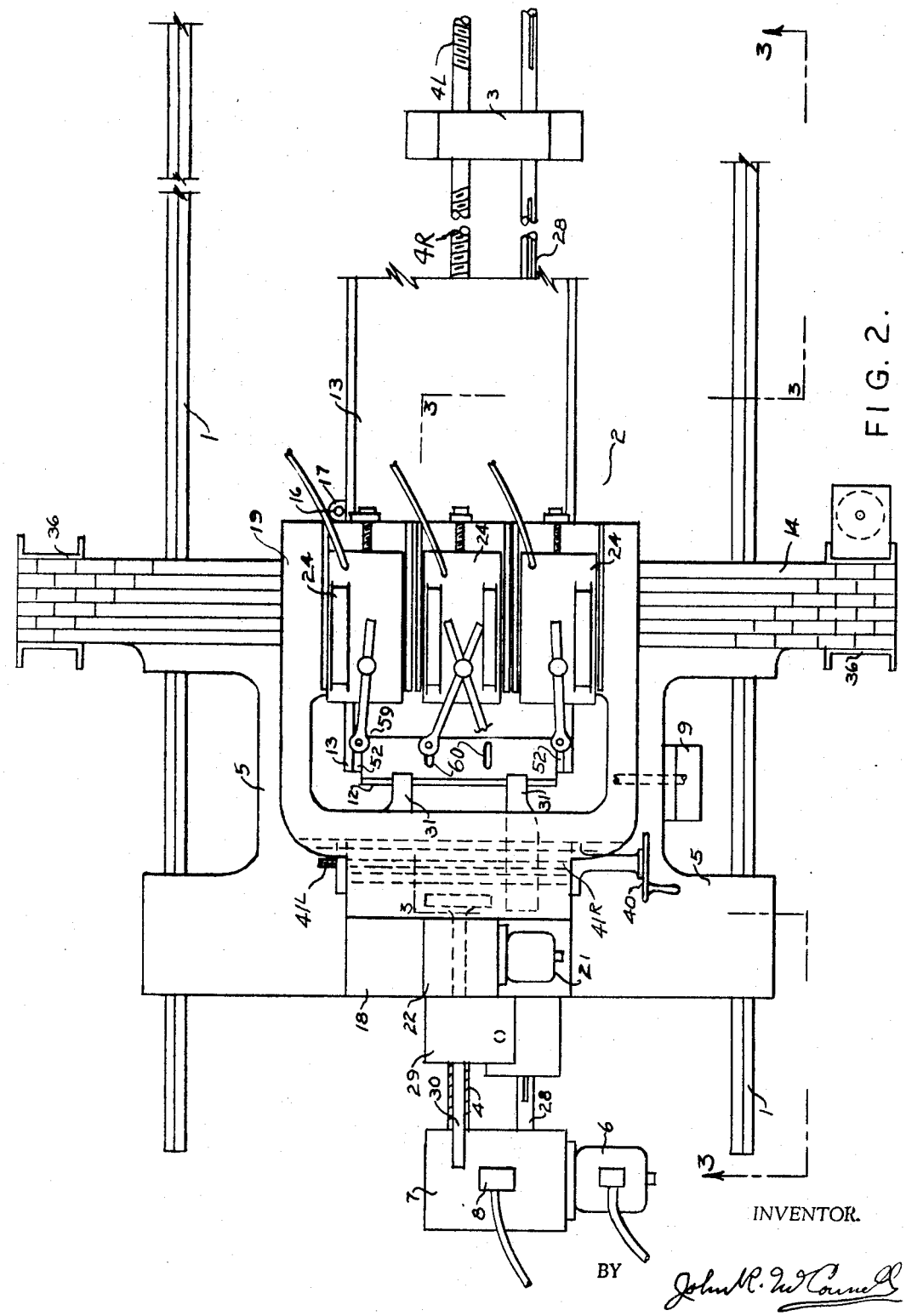

For other objects and a better understanding of the invention reference may be had to the following detailed description, taken in conjunction with the accompanying drawing in which:

FIG. 1 is an overall plan of the layout of the apparatus.
FIG. 2 is an enlarged plan of the end welder.
FIG. 3 is a sectional-elevation taken on FIG. 2.
FIG. 4 is a partial sectional-detail taken on FIG. 2.
FIG. 4A is a cross-section of hoist taken on FIG. 1.
FIG. 5 is an elevation of a dual angle unequal leg beam connection detail.
FIG. 6 is a plan-section taken on FIG. 5.

In brief the operation of the apparatus would be: the symmetrically located end welding units are converged towards or diverged from the midlength anchorage to pre-locate their operating centres a distance apart equal to the effective length of the beam member which is to be fabricated. This is effected by a motorized rotateable threaded shaft longitudinally anchored in the said anchorage. The left hand half of the shaft equipped with a right hand thread is threaded through the base of the left hand welder and the right hand half of the common shaft having a left hand thread threaded through the right hand welder base moves the welders equally in opposite directions on a common supporting-guiding track.

A raw shape is lowered by the hoist onto the dual transverse conveyor belt. Simultaneous actuation of the belts moves the shape forward till it is located under the overhead welding carriages by projectible stops. Equally projectible longitudinal rams length-centre the shape between the welders. With rams withdrawn vertical pistons and piston rods in fluid pressured cylinders on welder bases raise the shape equally off the belts. A thick copper bar with attached heavy grounding cable, insulated from the top of the piston rod furnishes the ground or opposite leg of the welding circuit. The welding heads cantilevered from and vertically guided in a back wall integral with welder base are lowered till the T (or angle) held in adjustable non-conductive grips rests firmly, but without substantial pressure on the web of the shape at each end of said shape. The welding mechanisms are actuated to fill and weld the required cavities and borders of the T to the shape. On completion of the welding, the welding carriages and the pistons are retracted, lowering the completed shape to the belts for forwarding to the discharge position, as a new shape moves into the fabricating area.

FIG. 1, a plan-layout of the co-ordinated apparatus, shows a two rail 1 track with bases 5 of dual end fusion welding units 2 slideably mounted and guided thereon, symmetrically spaced about a transverse centrally located anchorage 3. Said bases extend down between inside faces of rails and are fitted to their contours and triangular tops as shown in FIG. 5 of reference patent of McConnell No. 3,257,540 of June 21, 1966. A machine-moving re-spacing shaft 4, longitudinally anchored in 3, equipped with a right-hand threatd 4R on the left half and a left-hand thread 4L on the right half as shown in FIG. 3, threaded through the fabricator bases 5 and operated by a reversible motor, 6 speed reducer, 7 and a gear shift 8 symmetrically converges or diverges moves the welders 2 to any selected distance from the mid-length anchorage 3. A dial mechanism 9 of FIG. 3, directly geared to shaft 4, continuously records the distance the effective working centre 10 of the welder is from the mid-length anchorage 3, that is also the zero transverse measuring centre. This dimension multiplied by two gives the effective overall working length of the finished structural member 11 as measured over the outside faces of the end connection T's 12.

The raw beam shape 13 is placed on the dual conveyor belts 14 at the feed position 15 and is transversely forwarded to the centre line position of the welders where it is stopped by dual projectible stop pins 16, controlled by solenoids 17. After placement and welding on of the connection angles 12, the finished member 11 is progressed to discharge.

FIGS. 2 and 3 show on enlarged plan and a side elevation of the typical end welder 2 comprising a base 5 with back wall 18 supporting an inwardly projecting bracket 19 that is vertically adjustable. Said bracket T keyed 20 to the wall and moved by motor 21, speed reducer 22, and threaded shaft carries the plural automatic fusion welder carriages 24 with built-in drive and tracer 25 capable of following any prescribed pattern 26. When the shape 13 is moved to the fabricating area, the inwardly projectible rams 27 on the welders are symmetrically converged against the opposite ends of shape by the rotation of the longitudinally keyed shaft 28 acting through a train of gears 29 and shafts 30. Thus the shape is length centred over the mid-length anchorage 3 enabling the connection Ts' 12 to be placed with equal overhang at each end of shape to produce a finished member 11 of precise length from a shorter shape 13 that practical trade practices dictates shall be from one-half to one and one-half inches shorter. When rams 27 are retracted a liquid pressured cylinder, piston, piston rod and insulated bus bar with attached grounding cable raises the shape off the conveyor belt after which the aforementioned bracket 19 with non-conductive adjustable fingers 31 carrying a T shaped connection detail is lowered to contact the work piece 13. The automatic welding carriage 24 then fusion welds the connection angle to the end of the shape in the required pattern. A square groove fill weld 52 is made at the ends of the connection angle 12 bearing directly into the flange 53 of the shape with the bead carried partly down the inside edge 59 of the angle if added strength is required. Slot-plug welds 60 are made to stiffen angle against column action and buckling. There are various types and forms of molten fusion welding including thermit welding and automatic carriages which can be adapted to this use. An arc welder with wire filler metal 32 is shown with grounding or opposite leg 43 of circuit made by contact plate 33 raised against lower face of web by piston 34 in cylinder 35. Endless chain link conveyor belt 14 is mounted on channel posts 36 on inside edge of base with reversible motor 37 and speed reducer 38. The detail-holding fingers 31, T-keyed 39 to bracket may be adjusted for various length connection T's by handwheel 40 on threaded shaft 41, that threads through the fingers with opposite hand threads 41R and 41L on either end. Spring detents 42 or magnets or locking connections retain connection T in fingers till it is welded to the shape.

FIG. 4 shows the apparatus of FIG. 3 used to weld the fabricating trade's standardized dual connection angles 44 to the ends of the beam. Contact rollers 45 are substituted for plate 33. To do this the shape is forwarded to the fabricating area where one angle is welded to the top web face of the shape at each end. The conveyor belts 14 are reversed to return the shape 13 to the feed position 15. At this point the shape is rolled transversely by the hoist of FIG. 4A to bring the lower face of web uppermost. The shape is then forwarded to welding position when the rams are again converged to length-centre the shape and line up the outside faces of the dual connection angles at each end of the shape. The welding is again performed and finished member is forwarded to discharge.

The mechanized apparatus shown herein hoists and rolls the shape safely, rapidly and efficiently. On an overhead I beam 58 a chain hoist 46 with a free-hanging heavy endless lugged chain 47 looped over a sprocket 48 on hoist may be spotted near each end of shape. The lower loops 49 of the hanging chains are slipped about the ends of the shape 13, hoist cables 50 are raised slightly and both chains 47 are rotated to roll the shape. This device may also be used to load shapes from trucks or skids onto the conveyor.

In many cases, as shown in FIG. 5, it is required that a beam member 11 should fit to a supporting girder 57 with top surfaces flush. The depth of the supporting girder may also be the same as that of the shape 13. In these cases by existing fabricating practice the top flange or both flanges of beam 13 have to be cut away, for web of shape 13 to fit into the trough of the girder 57. This constitutes a preliminary, cumbersome, coping operation, requiring a second handling of the material. The figure also shows an improved practice whereby the beam end fitted with dual end connection angles 51 welded thereto by square groove fill welds 52 bears directly into the inside flange surfaces 53 of the beam shape 13. The longer legs 54 of the unequal leg angles 51 are arc fusion welded to opposite faces of the web of the shape with the outstanding short legs 55 and part of the long legs cut shorter to provide clearance for the top projecting flange 56 of the girder 57 to which the extended connection angles of the fabricated beam 11 must fit. Slot-plug welds 60 stiffen angles against buckling.

Every element of the operation, the equipment, the joint, and the type of securement, is co-operatively designed and integrated into a process that provides a joint of maximum strength in bending, shear, and resistance to rotation in a single continuing operation, rapidly and economically.

FIG. 6 shows a cross-section through the connection angles 51.

What I claim as new and desire to protect by Letters Patent of the United States is:

1. A fusion welding apparatus for the assembly fabrication of rolled structural steel members comprising a longitudinal track supporting dual mobile inwardly facing arc welding units symmetrically located on opposite sides of a transverse mid-length shaft anchorage, centred between a pair of rails of said track, powered longitudinal shaft oppositely threaded through bases of said welders for symmetrical respacing of said welders from said anchorage, a powered transverse conveyor belt on said welders for the conveying of structural shaps into and through the apparatus, powered longitudinal keyed shaft member anchored at mid-length, operating opposed longitudinally extendable plungers against opposite ends of said shape for the length centering of same over said mid-length anchorage, powered vertically adjustable bracket holding a connection T and an automatically guided self-powered fusion welding carriage for the placing and fusion welding of said connection T to the web of the raw shape whereby raw structural shapes are conveyed into the said apparatus, are length centred, measured, layed-out; connection details are applied and said connection T welded thereto producing a completely finished structural member of precise length from a raw shape of shorter random length in a single co-ordinated fabricating operation.

2. A fusion welding apparatus as in claim 1 further comprising plural fusion welding carriages for the welding of dual unequal leg connection angles to each side of the web of shape with narrow shorter legs outstanding for a flush top framing fit to a supporting I shaped girder, the ends of the web-contacting legs being welded by square groove welds into flanges of said shape.

3. A fusion welding apparatus for the assembly-fabrication of structural steel members comprising, in combination dual opposite-hand longitudinally-spaceable welding units including a base, backwall having an inwardly-extending fixed bracket mounting an automatically guided self-powered arc welding carriage and dual non-conducting transversely adjustable brackets to grip and place a connection angle on the web of a shape, a longitudinal dual-rail track for the support and guidance of said welding units, on each of said welder bases a liquid-pressured cylinder, piston, piston rod, insulated copper bus bar and attached copper grounding cable, for elevation of the shape-web up to a fixed welding position under the said welding carriage, on each of said welder bases a powered transverse endless shape-conveyor belt, extending through each of said welding-unit back walls, an inwardly projectible longitudinal plunger actuated by a powered common longitudinally-keyed shaft, a powered threaded shaft threaded through one of the said welding unit bases for variably relocating it in relation to the other said welding unit, electric current means, and liquid pressure means.

4. A fusion welding apparatus as in claim 3 further comprising an endless lugged chain looped over a rotatable sprocket support on a clevise raiseable on a power hoist mobilely mounted on an overhead track for the rotation about a longitudinal axis of said shapes for welding operations on each face of the web of said shapes.

5. A fusion welding apparatus as in claim 1 further comprising, a liquid pressured cylinder, piston, piston rod, insulated copper bus bar and attached copper grounding cable on each of the said dual welder bases for the elevation and insulation of the shape and the grounding of currents of substantial voltage and amperage in the welding of large heavy shapes.

References Cited

UNITED STATES PATENTS

| | | | |
|---|---|---|---|
| 2,533,605 | 12/1950 | Mueller | 219—9.5 |
| 3,085,148 | 4/1963 | McConnell | 219—79 |
| 3,128,366 | 4/1964 | McConnell | 219—78 |
| 3,154,665 | 10/1964 | Dunning et al. | 219—124 |
| 3,257,540 | 6/1966 | McConnell | 219—80 |

RICHARD M. WOOD, *Primary Examiner.*

W. D. BROOKS, *Assistant Examiner.*